United States Patent
Wang et al.

(10) Patent No.: US 8,730,986 B2
(45) Date of Patent: May 20, 2014

(54) SERVICE BEARING METHOD AND APPARATUS, SERVICE DATA RECEIVING METHOD AND RECEIVING TERMINAL

(75) Inventors: Bin Wang, Shenzhen (CN); Bin Yu, Shenzhen (CN); Zijiang Ma, Shenzhen (CN)

(73) Assignee: ZTE Corporation, Shenzhen, GD (CN)

( * ) Notice: Subject to any disclaimer, the term of this patent is extended or adjusted under 35 U.S.C. 154(b) by 0 days.

(21) Appl. No.: 13/390,457

(22) PCT Filed: May 13, 2010

(86) PCT No.: PCT/CN2010/072736
§ 371 (c)(1),
(2), (4) Date: Feb. 14, 2012

(87) PCT Pub. No.: WO2011/017949
PCT Pub. Date: Feb. 17, 2011

(65) Prior Publication Data
US 2012/0140778 A1    Jun. 7, 2012

(30) Foreign Application Priority Data
Aug. 14, 2009    (CN) .......................... 2009 1 0166152

(51) Int. Cl.
H04J 3/26    (2006.01)
H04J 3/16    (2006.01)
(52) U.S. Cl.
USPC .......................................... 370/432; 370/466
(58) Field of Classification Search
USPC .................. 370/208, 329, 432, 466
See application file for complete search history.

(56) References Cited

U.S. PATENT DOCUMENTS

| | | | |
|---|---|---|---|
| 2007/0104151 A1 | 5/2007 | Papasakellariou et al. | |
| 2009/0252077 A1* | 10/2009 | Khandekar et al. | 370/312 |
| 2010/0329171 A1* | 12/2010 | Kuo et al. | 370/312 |
| 2011/0103286 A1* | 5/2011 | Montojo et al. | 370/312 |
| 2011/0128903 A1* | 6/2011 | Futaki et al. | 370/312 |
| 2011/0261751 A1* | 10/2011 | Ode et al. | 370/315 |
| 2012/0014286 A1* | 1/2012 | Wang et al. | 370/254 |
| 2012/0039232 A1* | 2/2012 | Kwon et al. | 370/312 |
| 2013/0010672 A1* | 1/2013 | Chen et al. | 370/312 |

FOREIGN PATENT DOCUMENTS

| | | |
|---|---|---|
| CN | 101500195 | 8/2009 |
| JP | 2011-521512 | 7/2011 |
| WO | 2010/084574 | 7/2010 |

OTHER PUBLICATIONS

Nokia et al., "NBSFN Scheduling and Content Synchronization", 3GPP Draft; R3-071920 MBSFN Schedualing and Contect Synchronization, 3rd Generation Partnership Project (3GPP), Mobile Competence Center: 650, Route Des Lucioles; F-06921 Shopia-Antipolis Cedex, France. vol. RAN WG3, No. Sophia Antipolis, France 20071003, Oct. 3, 2007, XP050162710.

European Search Report dated Jan. 22, 2013, which issued during the prosecution of European Patent Application No. 10807894.

(Continued)

*Primary Examiner* — Andrew Lee
(74) *Attorney, Agent, or Firm* — Diederiks & Whitelaw, PLC

(57) ABSTRACT

A service bearer method and apparatus, a service data receiving method and a receiving terminal are provided. The method includes: a network side converts a Multimedia Broadcast and Multicast Service (MBSFN) sub-frame to a unicast service sub-frame and bears the unicast service on the converted unicast sub-frame. The method improves the utilization ratio of the wireless resources.

19 Claims, 10 Drawing Sheets

(56) References Cited

OTHER PUBLICATIONS

"Signaling of MBSFN Subframe Allocations", 3GPP TSG-RAN WG1 #50, R1-073711, Aug. 2007.

"Issue of dynamic CP length change in a cell with mixed unicast and MBMS transmission", 3GPP RAN WG1 meeting 47bis, R1-070357, Jan. 2007.

* cited by examiner

SERVICE BEARING METHOD AND APPARATUS, SERVICE DATA RECEIVING METHOD AND RECEIVING TERMINAL

CROSS-REFERENCE TO RELATED APPLICATIONS

This application represents a National Stage application of PCT/CN2010/072736 entitled "Service Bearer Method and Apparatus, Service Data Receiving Method and Receiving Terminal" filed May 13, 2010, pending.

FIELD OF THE INVENTION

The present invention relates to the field of mobile communication technology, and in particular, to a service bearing method and apparatus, a service data receiving method and a receiving terminal.

BACKGROUND OF THE INVENTION

At present, in order to effectively use the mobile network resources, the 3rd Generation Partnership Project (referred to as 3GPP) proposes a service of Multimedia Broadcast and Multicast Service (referred to as MBMS), which can achieve the point-to-multipoint service from one data source to multiple targets.

In the Long Term Evolution (referred to as LTE) system, the data channel and the control channel of the MBMS service can employ a single-cell transmitting mode and a multi-cells transmitting mode. The single-cell transmitting mode indicates that the control channel and the data channel of the MBMS service are only transmitted in present cell, and there is no Multicast Broadcast Single Frequency Network (referred to as MBSFN) macro diversity function; while the multi-cells transmitting mode indicates that multiple cells transmit the same data in the same time-frequency resources, viz. the MBMS service or control information employs a content synchronization manner, viz. employing the MBSFN macro diversity. Through the multi-cells transmitting mode, multiple cells transmit data or control signaling of the MBMS service of the same contents at the same time, which can improve the receiving gain of the User Equipment (referred to as UE).

Multicast Channel (referred to as MCH) is a transmission channel adapted for the point-to-multipoint transmission, and its corresponding physical resources are multicast resources allocated by the system for the transmission of the MBMS service. One carrier frequency can bear multiple MCHs. The physical channel bearing particular MCH is determined by a set of subframes of patterns. These frames may not be continuous in time, the pattern is referred to as an MCH subframe allocation pattern (referred to as MSAP), and each MSAP describes the physical resources of one MCH channel. In the LTE system, the multicast resources of each MBSFN region can be divided in the unit of subframe according to certain patterns. The resources indicated by each pattern constitute one MCH. Multicast Traffic Channel (referred to as MTCH) is a logical channel. One MTCH bears the data of one or more services, and one service is only beared in one MTCH. The MTCH is mapped to the MCH for transmission, and one or more MTCHs can be mapped to one or more MCHs, viz. multiple MBMS services can be mapped to one MCH.

The features of employing the multi-cells transmitting mode for the MBMS transmission comprise: synchronous transmission in the MBSFN region; supporting multi-cells MBMS transmission data combination; mapping MTCH and MCCH to MCH transmission channel in the p-T-m mode, etc.

Through the MSAP information, the UE can acquire the specific multicast resources corresponding to a specific MCH. However, as the MCH contains the data of one or more MBMS services (for example, one or more MTCHs), it is necessary to specify, through the MBMS dynamic schedule information, the specific physic resources corresponding to a certain MBMS service, so that, when the UE receives a particular MBMS service, the UE can acquire the exact resources of the MBMS service through the indication of the MBMS dynamic schedule information, so as to achieve accurate receiving and save the energy consumption of the UE.

Currently, in the LTE network, there exist two subframe structures, namely unicast subframe and MBSFN subframe structures. The two subframe structures are both further divided based on Orthogonal Frequency Division Multiplexing (referred to as OFDM) symbol in time domain. In order to reduce inter-symbol interference, the two subframe structures are respectively added with a cyclic prefix (referred to as CP) in the OFDM symbol time domain. At present, in the case of 15 KHz subcarrier interval, there are two CPs in all, viz. a Normal cyclic prefix and an Extended cyclic prefix. As the time length of the extended CP is greater than that of the normal CP, therefore in one subframe, if extended CP is configured, there are a total of 12 OFDM symbols, as shown in FIG. 1A, and if normal CP is configured, there are a total of 14 OFDM symbols, as shown in FIG. 1B. Specifically: 1. normal CP, for the OFDM symbol with number 0, the length $T_{CP}=160 \times Ts$, and for the OFDM symbols with number 1 to 6, the length $T_{CP}=144 \times Ts$; 2. extended CP, for the OFDM symbols with number 0 to 5, the length $T_{CP-e}=512 \times Ts$, wherein $Ts=1/30720$ ms.

In the current protocol, the configuration of the MBSFN subframe structure requires that the first one or two OFDM symbols in the MBSFN subframes are reserved as non-MBSFN symbols for the non-MBSFN transmission, and the one or two non-MBSFN symbols employ the same CP configuration as the subframe of number 0, viz. it may be either a normal CP or an extended CP. The MBSFN transmission is carried out in the rest OFDM symbols in the MBSFN subframes. These OFDM symbols are referred to as MBSFN symbols, and in order to facilitate the realization of synchronization and macro diversity, the extended CP configuration is adapted for the MBSFN symbols. Moreover, when the non-MBSFN symbols employ the normal CP configuration, an essential protection time gap is needed between the non-MBSFN symbols and the MBSFN symbols, as shown in FIG. 2A; and when the non-MBSFN symbols employ the extended CP configuration, no protection time gap is needed between the non-MBSFN symbols and the MBSFN symbols, as shown in FIG. 2B. For the MBSFN subframes, the user who does not receive the MBMS service only performs receiving on the first one or two OFDM symbols of the MBSFN subframes, but does not perform receiving on other OFDM symbols.

In the related art, the resources under the scheduling/domination of the MBMS dynamic schedule information are defined in time length as schedule period, such as 320 ms, 640 ms and so on. FIG. 3A and FIG. 3B are schematic diagrams of the logical relation between the setting of the existing schedule block in a schedule period and the MBMS service. FIG. 3B shows the subframes such as subframe 0, subframe 4, subframe 5 and subframe 9, which the protocol stipulates that cannot be adapted for carrying the MBMS service. As shown in FIG. 3A and FIG. 3B, the network side is configured with the allocation information of multicast subframes, wherein the schedule block contains the schedule information of all the services in the schedule period, the schedule block is transmitted at the most initial position of the entire schedule period, and the range of the schedule resources is all the MBMS services in the schedule period. The most initial position can be the first multicast subframe or the corresponding physical resources in the schedule period.

For the network side, the configuration of the multicast subframe resources for transmitting the MBMS service is carried out by semi-static configuration according to the MBMS service volume of the current system bearer. As the semi-static configuration has the features of slow variation and uniformization of resource allocation, while the service data volume of the MBMS service has the features of fast variation and burst, the inconsistent features between the two would possibly lead to mismatching between the resource allocation and the data volume to be transmitted, which is usually reflected in the occurrence of over-allocation multicast subframes in a dynamic schedule period. Since the over-allocation multicast subframes do not bear the MBMS service, and thus the unicast users only receive data of unicast control region of multicast subframes, the over-allocation multicast subframes neither bear a multicast service nor bear a unicast service, which results in the waste of the radio resources, and reduces the utilization rate of the radio resources.

SUMMARY OF THE INVENTION

In view of the above, a service bearing method and apparatus, a service data receiving method and a receiving terminal are provided in the present invention, in order to solve the problem existing in the related art that the radio resources are wasted as the over-allocation multicast subframes do not bear any service.

According to one aspect of the present invention, a service bearing method is provided, which is used for bearing a service in MBSFN subframes.

The service bearing method according to the present invention comprises: a network side converting a MBSFN subframe to a unicast service subframe; and bearing the unicast service on the converted unicast subframe.

According to another aspect of the present invention, a service data receiving method is provided, which is used in a receiving terminal for receiving service data transmitted by the network side.

The service data receiving method according to the present invention comprises: a receiving terminal receiving a MBSFN subframe; detecting downlink resource assignment information in a non-MBSFN region of the MBSFN subframe; and receiving user data in unicast subframe structure on the MBSFN subframe according to the downlink resource assignment information.

According to a further aspect of the present invention, a service bearing apparatus is provided, which is adapted for bearing a service in an MBMS system.

The service bearing apparatus according to the present invention comprises: a conversion module and a scheduling module, wherein the conversion module is adapted, on an MBSFN subframe, for converting a MBSFN subframe to a unicast subframe for bearing a unicast service; and the scheduling module is adapted for bearing the unicast service on the converted unicast subframe, and indicating downlink resource assignment information of the unicast service in a control region of the unicast subframe.

According to a still another aspect of the present invention, a receiving terminal is provided, which is adapted for receiving service data transmitted by the network side in an MBMS system.

The receiving terminal according to the present invention comprises: a first receiving module, a detecting module and a second receiving module, wherein the first receiving module is adapted for receiving an MBSFN subframe from a network side; the detecting module is adapted for detecting downlink resource assignment information in a non-MBSFN region of the received MBSFN subframe; and the second receiving module is adapted for receiving, in the case where the downlink resource assignment information is detected by the detecting module in the non-MBSFN region, user data in unicast subframe structure on the MBSFN subframe according to the detected downlink resource assignment information.

Through at least one of the above solutions of the present invention, the network side converts an MBSFN subframe to a subframe bearing a unicast service and bears the unicast service on the converted subframe, which solves the problem that the radio resources are wasted as the over-allocation multicast subframes do not bear any service, and improves the utilization rate of the radio resources.

Other characteristics and advantages of the present invention will be explained in the following description. Moreover, parts of them become obvious from the description, or can be understood by carrying out the present invention. The object and other advantages can be realized and obtained through the structure particularly mentioned in the description, the claims, and the drawings.

BRIEF DESCRIPTION OF THE DRAWINGS

The drawings are used to provide further understanding of the present invention and form a part of the specification, which are used to explain the present invention with embodiments of the present invention rather than unduly limit the present invention. In the drawings.

DETAILED DESCRIPTION OF THE PREFERRED EMBODIMENTS

In the relevant technology, the configuration of the multicast subframe resources for transmitting the MBMS service is carried out by semi-static configuration according to the MBMS service volume of the current system bearer, which would possibly lead to the occurrence of over-allocation multicast subframes in a dynamic schedule period. And the over-allocation multicast subframes do not bear any service, which thereby results in the waste of the radio resources. In view of this problem, a service bearing method and a service data receiving method are provided in the embodiments of the present invention. In the embodiments of the present invention, the network side converts, on an MBSFN subframe, the MBSFN subframe to a unicast subframe used for bearing a unicast service, converts a non-MBSFN region of the MBSFN subframe to a control region of the unicast subframe, bears the unicast service on the converted unicast subframe, and indicates, in the control region of the unicast subframe, downlink resource assignment information of the unicast service in the subframe. When the receiving terminal receives the MBSFN subframe, if the downlink resource assignment information is parsed from the non-MBSFN region of the MBSFN subframe, the receiving terminal receives user data in unicast subframe structure on the MBSFN subframe according to the downlink resource assignment information.

The embodiments of the present invention and the features of the embodiments can be combined with each other if there is no conflict.

The preferred embodiments of the present invention are described as follows in conjunction with the drawings. It shall be understood that the preferred embodiments described herein are only used to describe and explain the present invention and shall not be construed as improper limitations on the same.

According to an embodiment of the present invention, first a service bearing method is provided, which is used for bearing a service in the MBSFN subframe.

Figure 1A:
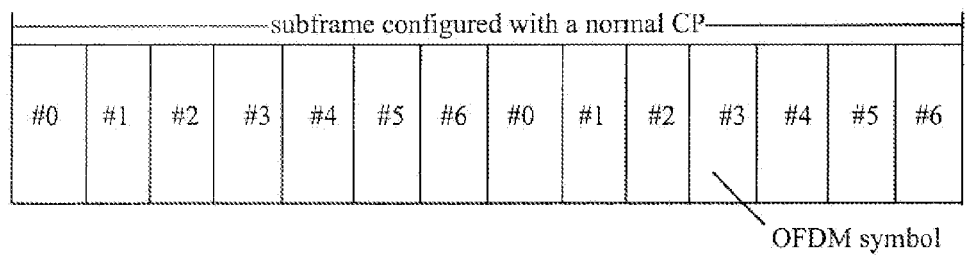
FIG. 1A is a structural schematic diagram of a subframe configured with an extended CP in the relevant technology.
Figure 1B:
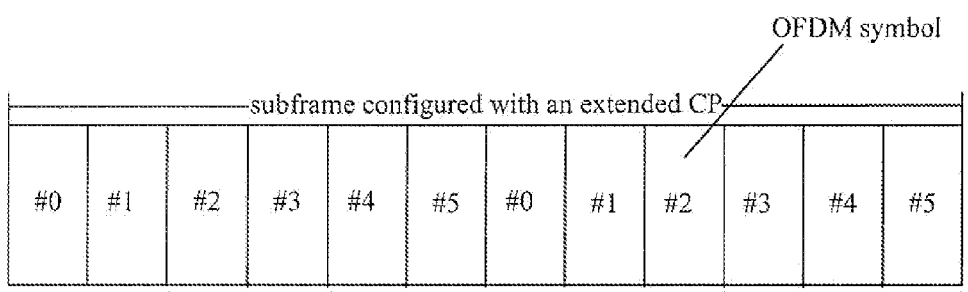
FIG. 1B is a structural schematic diagram of a subframe configured with a normal CP in the relevant technology.
Figure 2A:
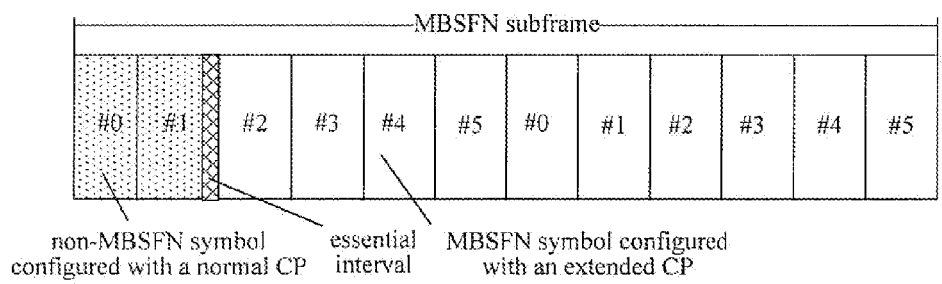
FIG. 2A is a structural schematic diagram of an MBSFN subframe when a non-MBSFN symbol is configured with a normal CP in the relevant technology.
Figure 2B:
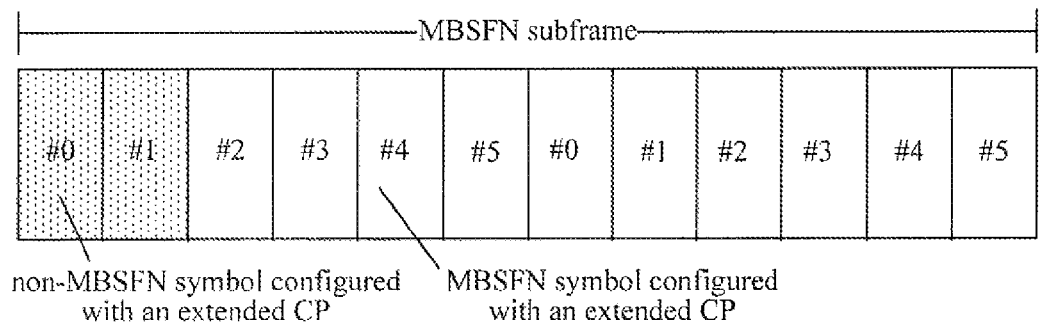
FIG. 2B is a structural schematic diagram of an MBSFN subframe when a non-MBSFN symbol is configured with an extended CP in the relevant technology.
Figure 3A:
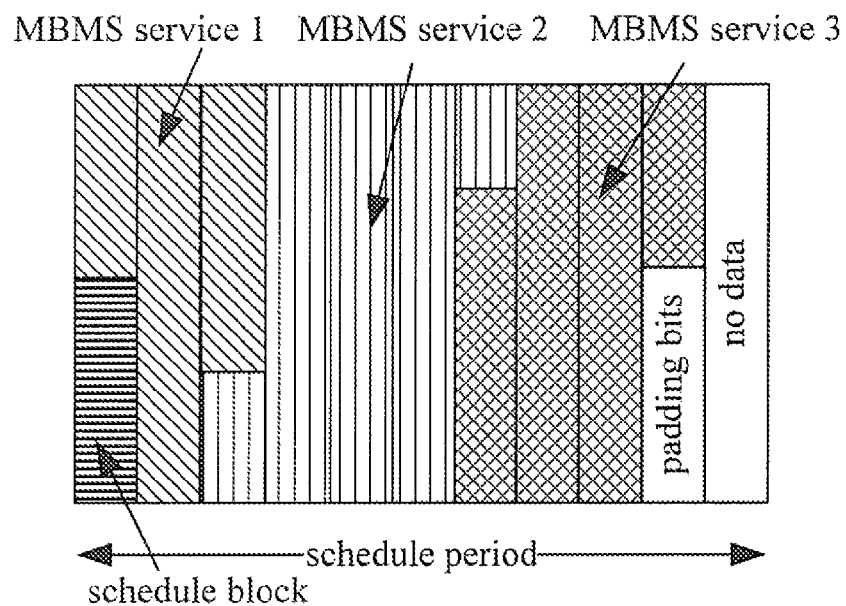
FIG. 3A is a schematic diagram of a logical relation between the setting of the existing schedule block in a schedule period and the MBMS service.
Figure 3B:
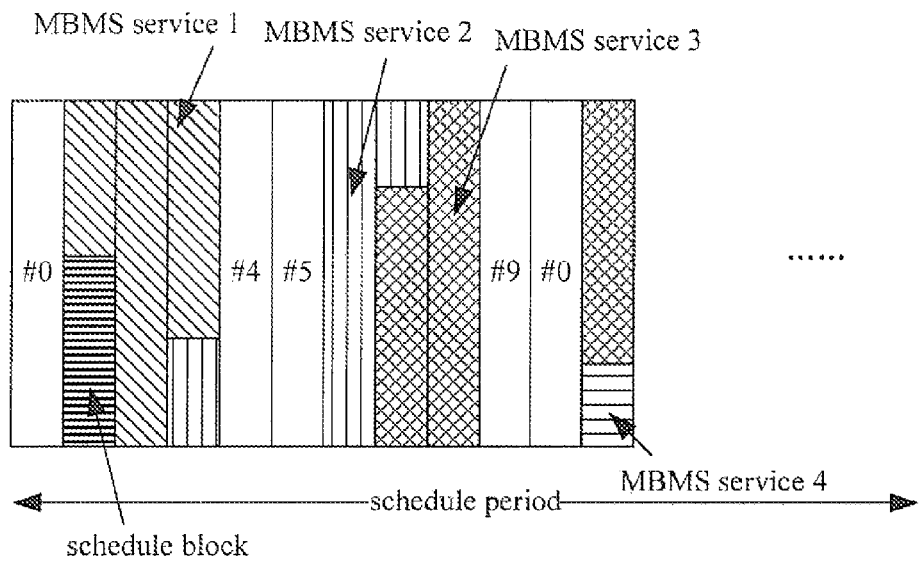
FIG. 3B is a schematic diagram of another logical relation between the setting of the existing schedule block in a schedule period and the MBMS service.
Figure 4:
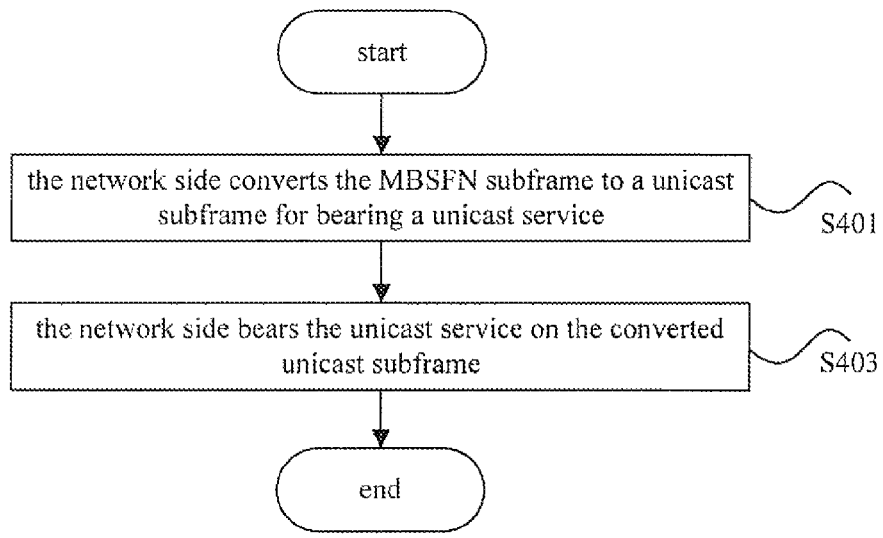
FIG. 4 is a flowchart of the service bearing method according to an embodiment of the present invention.

FIG. 4 is a flowchart of the service bearing method according to an embodiment of the present invention. As shown in FIG. 4, the service bearing method according to an embodiment of the present invention mainly comprises the steps of (step S401-step S403):

step S401, the network side converts, on an MBSFN subframe, the MBSFN subframe to a unicast subframe for bearing a unicast service; and step S403, the network side bears the unicast service on the converted unicast subframe.

In the relevant technology, the over-allocation multicast subframes do not bear any service, which results in the waste. In the embodiment of the present invention, the unicast subframe structure enables the transmission of the unicast service. Thus, by converting an MBSFN subframe to a unicast subframe to bear a unicast service, the waste of the over-allocation multicast subframe resources can be avoided, which thereby improves the utilization rate of the radio resources.

Preferably, the length of CP employed by the converted unicast subframe is same as the length of CP of the non-MBSFN region of the MBSFN subframe which is converted. Alternatively, the length of CP employed by the converted unicast subframe is same as the length of CP of the subframe with number 0 (viz. subframe 0 #) of the frame in which the MBSFN subframe which is converted is located.

Preferably, the network side converts the non-MBSFN region of the MBSFN subframe, which is converted, to the control region of the unicast subframe. Moreover, the number of the OFDM symbols occupied by the control region of the converted unicast subframe is the same as the number of the OFDM symbols occupied by the non-MBSFN region of the MBSFN subframe which is converted.

It shall be explained that the present preferred embodiment can enhance the backward compatibility of the network side.

Preferably, the downlink resource assignment information of the unicast service is indicated in the control region of the unicast subframe.

It shall be explained that, the downlink resource assignment information of the unicast service indicated in the control region of the converted unicast subframe comprises the resources of the physical layer control information on the subframe, which comprises Physical Downlink Control Channel (referred to as PDCCH), Physical Hybrid Automatic Repeat Request Indicator Channel (referred to as PHICH), Physical Control Format Indicator Channel (referred to as PCFICH) and the resource information of the reference pilot.

In the specific application, the specific bearing manner of the unicast service is the same as the manner of bearing the unicast service on the unicast subframe in the related art, and as to the specific bearing manner, no further description is repeated in the embodiments of the present invention.

Preferably, when the network side bears the unicast service on the converted unicast subframe, the network side can transmit on the converted unicast subframe a pilot which is used for bearing the unicast service. Moreover, the network side can also transmit on the converted unicast subframe a scrambling code sequence which is used for bearing the unicast service.

It shall be explained that, in the present preferred embodiment, the pilot pattern employed by the pilot can follow the related art. Moreover, as to the scrambling code sequence, the scrambling code sequence in the existing unicast subframe can be used.

It shall be explained that, for the Time Division Duplex (referred to as TDD) system, the conversion from an MBSFN subframe to a unicast subframe provided by the embodiment of the present invention is only applicable to a downlink unicast subframe, and is not applicable to an uplink unicast subframe.

Preferably, when the receiving terminal receives the converted unicast subframe, the receiving terminal first receives the downlink resource assignment information from the control region of the unicast subframe, and according to the downlink resource assignment information, the receiving terminal can receive the data of the unicast service which is born on the unicast subframe.

In the specific implementation process, when the receiving terminal receives the MBSFN subframe, the receiving terminal first detects the downlink resource assignment information in the non-MBSFN region of the MBSFN. If the downlink resource assignment information is detected, the receiving terminal receives user data in unicast subframe structure on the MBSFN subframe, and if the downlink resource assignment is not detected in the non-MBSFN region, the receiving terminal does not know that the MBSFN subframe has been changed to a unicast subframe, thus, the receiving terminal only receives the contents of the MBSFN region of the subframe.

In the specific implementation process, the network elements of the receiving terminal can be a UE, an R8 UE, a UE of R9 or later release, an eNB, a Relay Node, an MCE, an AGW and so on. It shall be explained that, if the receiving terminal is an R8 UE, as the R8 UE does not support the MBMS service and for the R8 UE the corresponding protocol has been frozen, the R8 UE cannot support the receiving of the corresponding unicast service on the converted unicast subframe. Thus, for the R8 UE, if the downlink resource assignment is received in the control region of the converted unicast subframe, an error for the downlink resource assignment will be reported or the downlink resource assignment will be neglected, and therefore, in this case, the network side shall try not to schedule the R8 UE on the over-allocation multicast subframes.

Preferably, the network side can comprise, but is not limited to, one of the following: an eNB, a Relay Node, an MBMS coordination entity (MCE), an Access Gate Way (referred to as AGW) and so on.

Preferably, when scheduling the MBMS service in one schedule period, the network side can convert, after all of the MBMS services in the schedule period have been scheduled, the remaining MBSFN subframes in the schedule period to the unicast subframes which bear the unicast service.

According to an embodiment of the present invention, a service data receiving method is further provided, wherein the method is used for receiving, at the receiving terminal of the MBMS system, the service data transmitted by the network side, and the method can be used in combination with above service bearing method. The service data receiving method comprises the steps of:

step a, the receiving terminal receiving the MBSFN subframe;

step b, detecting the downlink resource assignment information in the non-MBSFN region of the MBSFN subframe; and step c, receiving user data in unicast subframe structure on the MBSFN subframe according to the downlink resource assignment information.

Figure 5:
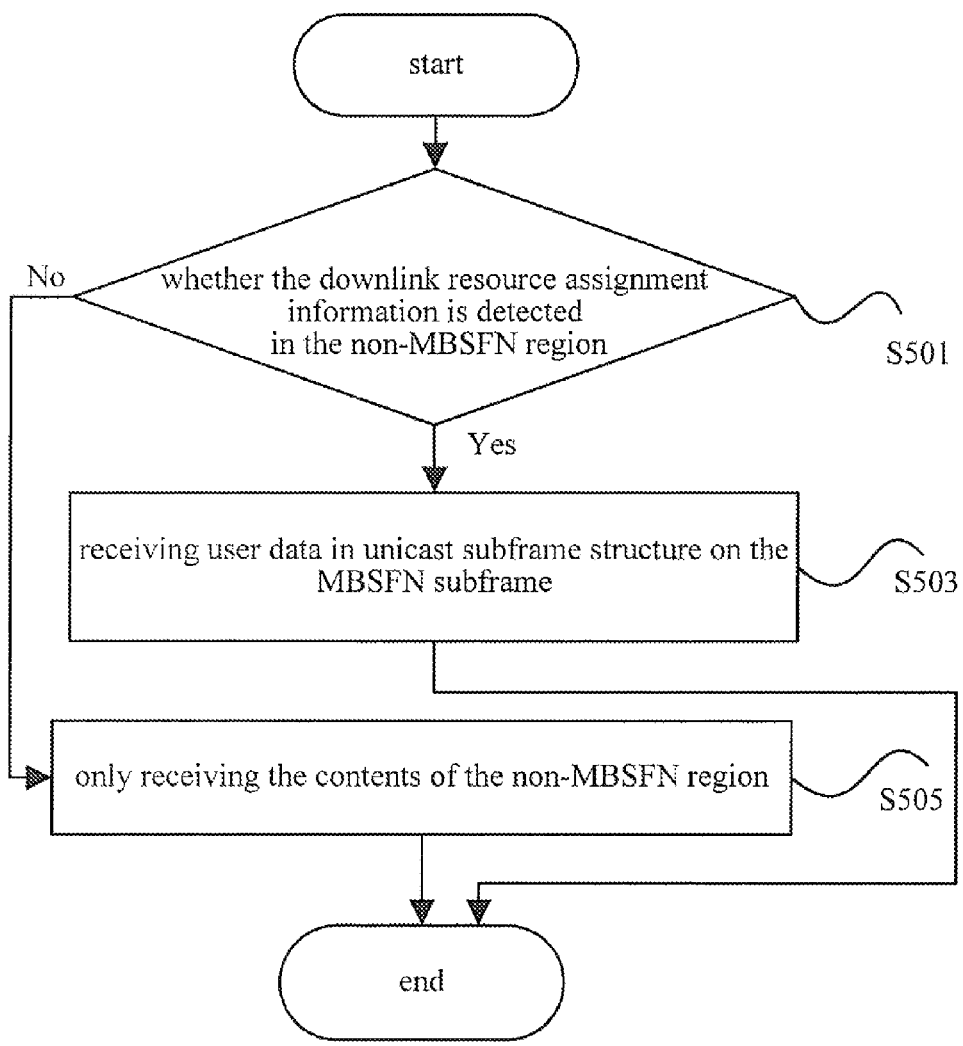
FIG. 5 is a flowchart of the service data receiving method according to an embodiment of the present invention.

FIG. 5 is a flowchart of the service data receiving method according to an embodiment of the present invention, which describes the implementing process of step a-step c.

Step S501, when receiving the MBSFN subframe, the receiving terminal detects the downlink resource assignment information in the non-MBSFN region of the MBSFN subframe; if the downlink resource assignment information is detected, step S503 is carried out; otherwise, step S505 is carried out.

Step S503, the user data is received in unicast subframe structure on the MBSFN subframe according to the detected downlink resource assignment information.

In the specific implementation process, when the downlink resource assignment information is detected by the receiving terminal on the current MBSFN subframe, it indicates that the network side has converted the MBSFN subframe to a unicast subframe. Thus, the receiving terminal receives the user data in unicast subframe structure on the MBSFN subframe.

Step S505, the receiving terminal only receives the contents of the non-MBSFN region.

Figure 6:
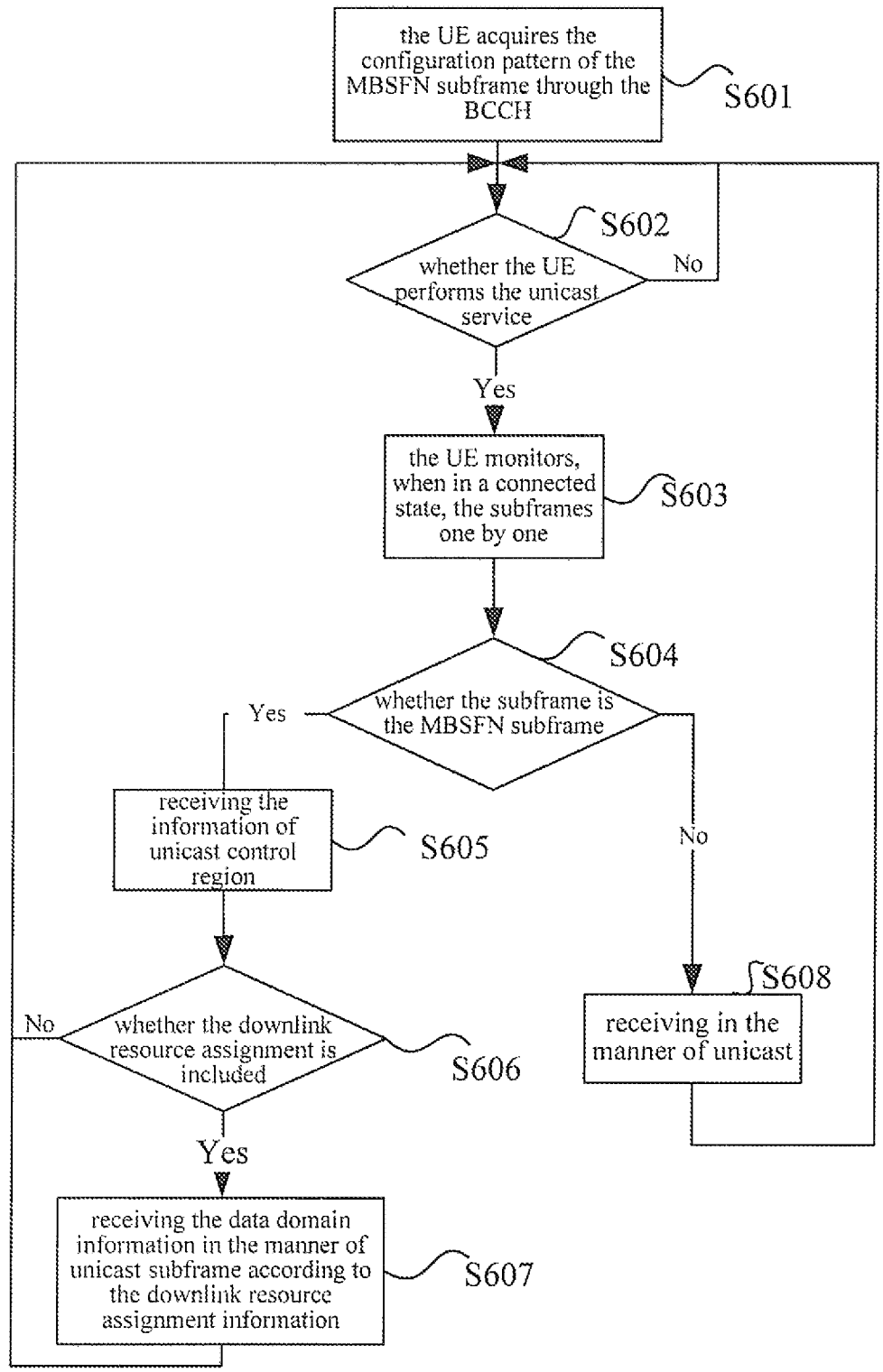
FIG. 6 is a flowchart of specific implementation of the service data receiving method according to an embodiment of the present invention.

FIG. 6 is a flowchart of specific implementation of the service data receiving method according to an embodiment of the present invention, when the receiving terminal is a UE of R9 or later release, including the steps of:

step S601, the UE acquires the configuration pattern of the MBSFN subframe through the BCCH;

step S602, it is judged whether the UE performs the unicast service, if yes, step S603 is carried out, otherwise, further judging whether the UE performs the unicast service;

step S603, the UE monitors, when in a connected state, the subframes one by one, when the subframe is monitored, step S604 is carried out;

step S604, the UE judges whether the subframe is the MBSFN subframe, if yes, step S605 is carried out, otherwise, step S608 is carried out;

step S605, the UE receives the information of the non-MBSFN region (viz. the control region of the converted unicast subframe) of the MBSFN subframe;

step S606, it is judged whether the received information of the non-MBSFN region includes the downlink resource assignment information, if yes, step S607 is carried out, otherwise, step S602 is carried out;

step S607, the UE receives the data domain information in the manner of unicast subframe according to the received downlink resource assignment information; and step S608, the UE receives in the manner of unicast.

For the further understanding of the technical solutions provided in the embodiments of the present invention, the technical solutions provided in the embodiments of the present invention are described with specific embodiments as follows.

Embodiment 1

Figure 7:
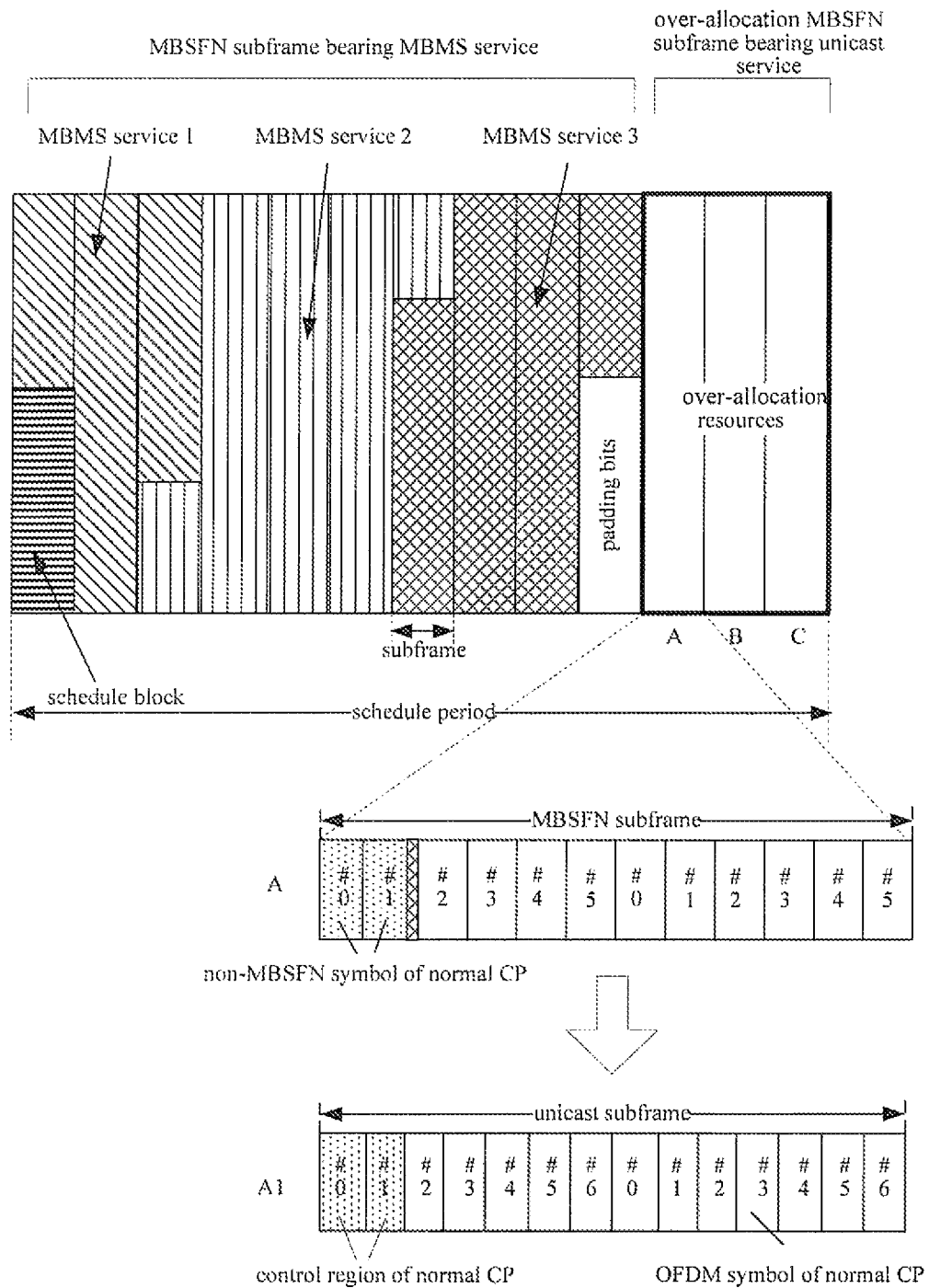
FIG. 7 is a schematic diagram of MBSFN subframe conversion in Embodiment 1.

In the Embodiment 1, descriptions are given taking the schedule period of the MBMS service shown in FIG. 7 as an example.

FIG. 7 is a schematic diagram of MBSFN subframe conversion in Embodiment 1. As shown in FIG. 7, the network side configures the MBSFN subframe resources transmitting the MBMS service in the schedule period. After all the MBMS services have been configured, the multicast subframes A, B, C are over-allocation multicast subframes. The present embodiment describes the specific processing procedures of the technical solutions provided in the embodiments of the present invention, taking the multicast subframe A as an example. And as to the multicast subframes B, C, the processing procedures thereof are the same as those of the subframe A.

In the present embodiment, the transmitting terminal performs the steps of:

step 1, as the CP length of the non-MBSFN region of the over-allocation multicast subframe A is the normal CP length, the transmitting terminal converts the over-allocation multicast subframe A to the unicast subframe format with the normal CP length; and the number of the OFDM symbols occupied by the control region of the converted unicast subframe A1 is 2; and step 2, the transmitting terminal bears the unicast service on the converted unicast subframe A1, the specific bearing manner is the same as the manner of the unicast subframe bearing the unicast service in the related art.

In the Embodiment 1, if the receiving terminal is an R8 UE, when the R8 UE receives the downlink resource assignment on the control region of the converted unicast subframe, an error for the downlink resource assignment will be reported or the downlink resource assignment will be neglected. But for an R9 UE or a UE of later release and other receiving terminals, the following steps are carried out:

step 1, receiving the downlink resource assignment on the control region of the converted unicast subframe;

step 2, converting the receiving manner of the multicast subframe to the receiving manner of the unicast subframe for receiving; and step 3, receiving the unicast service on the converted unicast subframe, wherein the specific receiving manner is the same as the manner of the unicast subframe receiving the unicast service in the related art, and no repeated description is given here.

Embodiment 2

Figure 8:
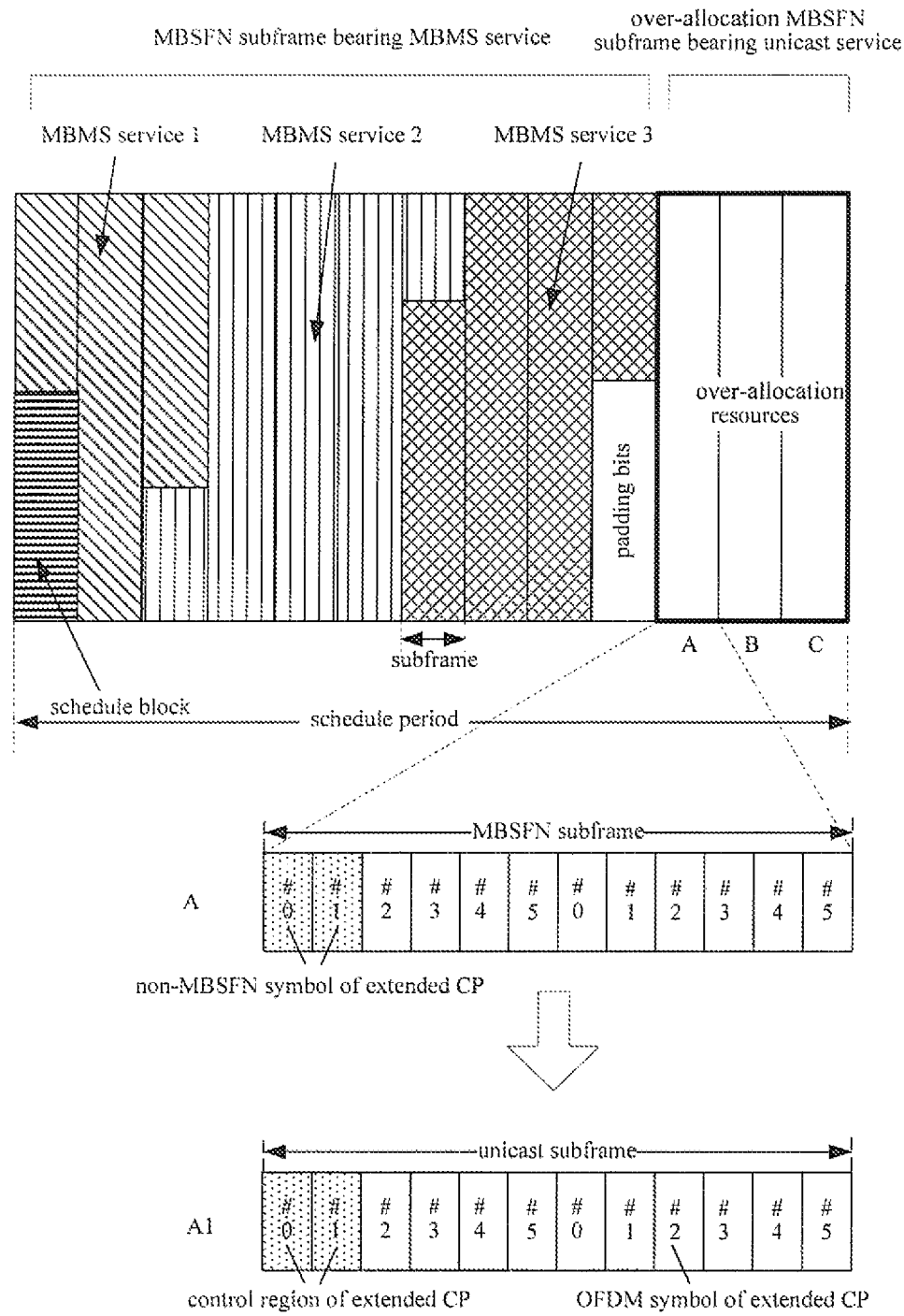
FIG. 8 is a schematic diagram of MBSFN subframe conversion in Embodiment 2.

In the Embodiment 2, descriptions are given taking the schedule period shown in FIG. 8 as an example.

FIG. 8 is a schematic diagram of MBSFN subframe conversion in Embodiment 2. As shown in FIG. 8, the network side configures in one schedule period the multicast subframe resources transmitting the MBMS service. The multicast subframes A, B, C are over-allocation multicast subframes. In the present embodiment, descriptions are given taking the multicast subframe A as an example, and as to the multicast subframes B, C, the processing procedures thereof are the same as those of the subframe A. The non-MBSFN symbol (viz. non-MBSFN region) of the multicast subframe A in the present example employs the extended CP. Thus, the difference between the present embodiment and Embodiment 1 lies in that there is no essential interval between the non-MBSFN symbol and the MBSFN symbol in the subframe A.

In the present embodiment, for the transmitting terminal, step 1, as the CP length of the non-MBSFN region of the over-allocation multicast subframe A is the extended CP length, the over-allocation multicast subframe A is converted to the unicast subframe format with an extended CP length, and the number of the OFDM symbols occupied by the control region of the converted unicast subframe A1 is 2; and step 2, the unicast service is born on the converted unicast subframe, and the specific bearing manner is the same as the manner of the unicast subframe bearing the unicast service in the related art.

In the Embodiment 2, for the receiving terminal, such as R9 or later release UE:

step 1, receiving the downlink resource assignment on the control region of the converted unicast subframe;

step 2, the receiving terminal converting the receiving manner of the multicast subframe to the unicast subframe receiving manner; and step 3, receiving the unicast service on the converted unicast subframe, wherein the specific receiving manner is the same as the manner of the unicast subframe receiving the unicast service in the related art.

Embodiment 3

Figure 9:
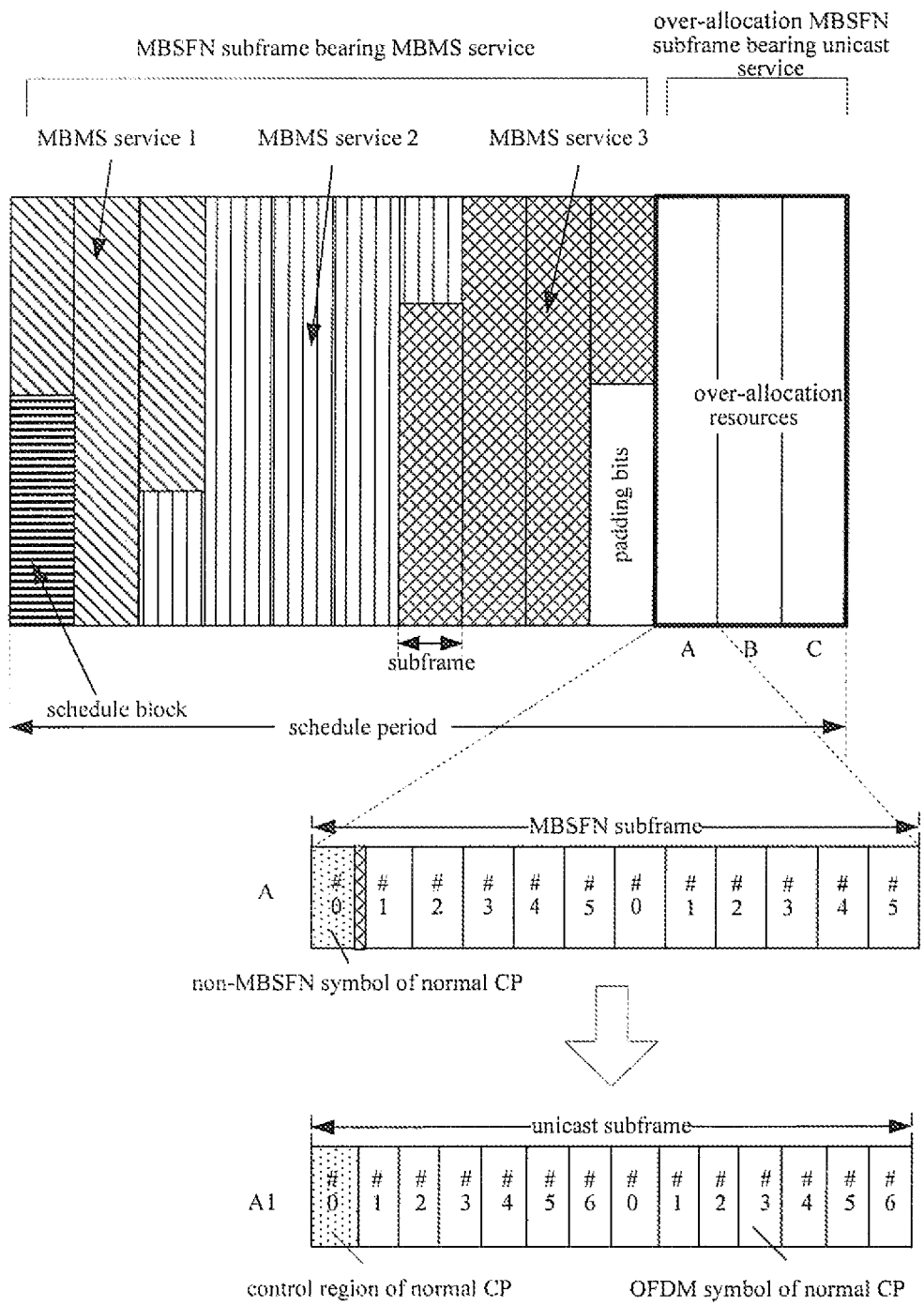
FIG. 9 is a schematic diagram of MBSFN subframe conversion in Embodiment 3.

In the Embodiment 3, descriptions are given taking the schedule period shown in FIG. 9 as an example.

FIG. 9 is a schematic diagram of MBSFN subframe conversion in Embodiment 3. As shown in FIG. 9, in the schedule period, the multicast subframes A, B, C are over-allocation multicast subframes. In the present embodiment, descriptions are given taking the multicast subframe A as an example. The difference between the present embodiment and Embodiment 1 lies in that, in the present embodiment, the non-MBSFN symbol of the multicast subframe A occupies 2 OFDM symbols.

In the Embodiment 3, the transmitting terminal will perform the following processing:

step 1, as the CP length of the non-MBSFN region of the over-allocation multicast subframe A is the normal CP length, the transmitting terminal converts the over-allocation multicast subframe A to the unicast subframe format with a normal CP length; and as the number of the OFDM symbols occupied by the non-MBSFN region of the multicast subframe A is 1, the number of the OFDM symbols occupied by the control region of the converted unicast subframe A1 is 1; and step 2, the transmitting terminal bears the unicast service on the converted unicast subframe A1, and the specific bearing manner is the same as the manner of the unicast subframe bearing the unicast service in the related art.

In the present embodiment, the receiving terminal will perform the following processing:

if it is an R8 UE, the R8 UE receives the downlink resource assignment on the control region of the converted unicast subframe, and an error for the downlink resource assignment will be reported or the downlink resource assignment will be neglected; and if it is an R9 or later release UE, it performs the following operations:

step 1, receiving the downlink resource assignment on the control region of the converted unicast subframe;

step 2, the UE converting the receiving manner of the multicast subframe to the unicast subframe receiving manner; and step 3, the UE receives the unicast service on the converted unicast subframe, wherein the specific receiving manner is the same as the manner of the unicast subframe receiving the unicast service in the related art.

Embodiment 4

Figure 10:
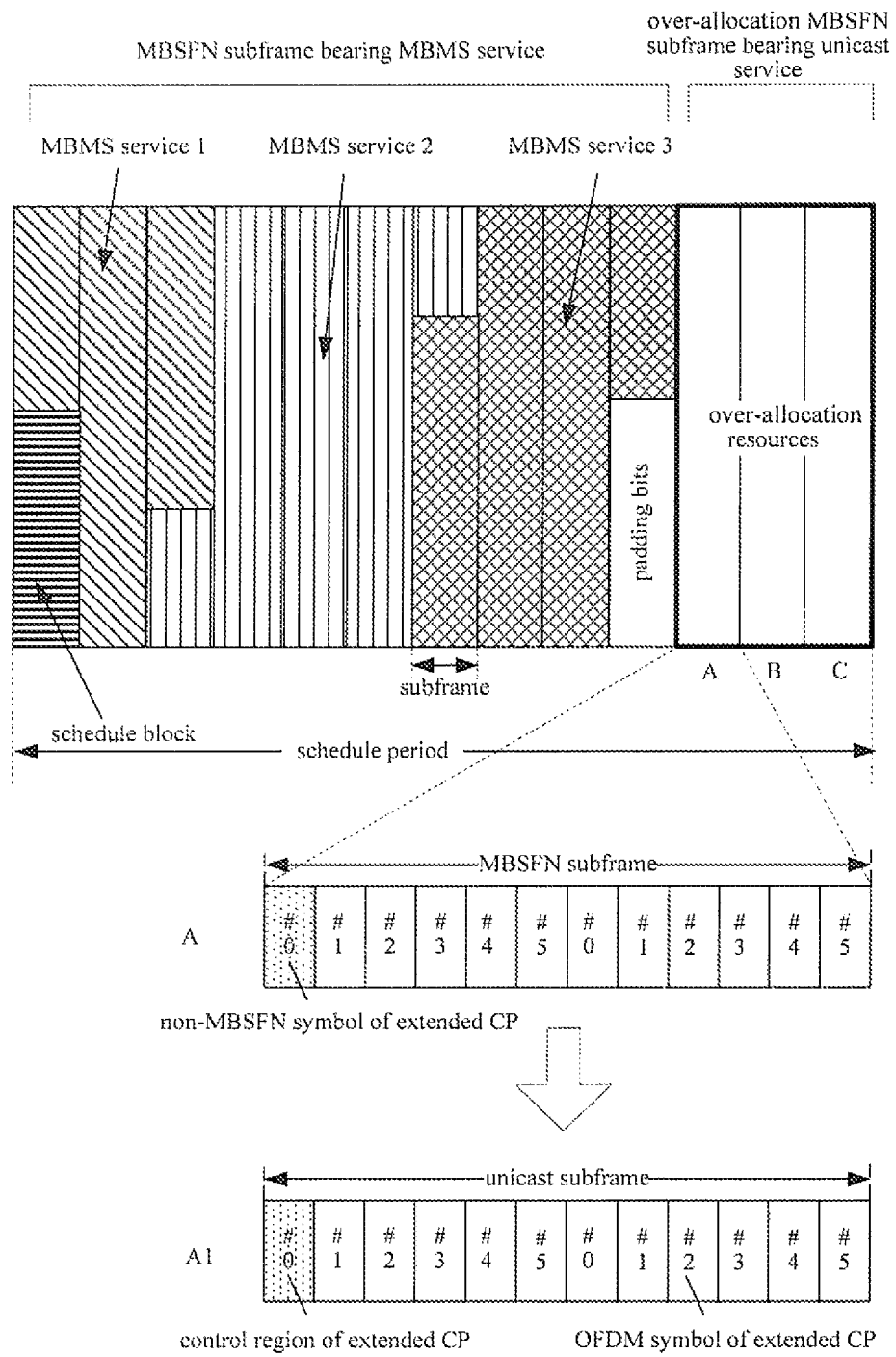
FIG. 10 is a schematic diagram of MBSFN subframe conversion in Embodiment 4.

In the Embodiment 4, descriptions are given taking the schedule period shown in FIG. 10 as an example.

FIG. 10 is a schematic diagram of MBSFN subframe conversion in Embodiment 4. As shown in FIG. 10, in the schedule period, the multicast subframes A, B, C are over-allocation multicast subframes. In the present example, descriptions are given taking the multicast subframe A as an example. The difference between the present embodiment and Embodiment 2 lies in that, in the present embodiment, the non-MBSFN symbol of the multicast subframe A occupies 2 OFDM symbols.

In the Embodiment 4, the transmitting terminal will perform the following processing:

step 1, as the CP length of the non-MBSFN region of the over-allocation multicast subframe A is the normal CP length, the transmitting terminal converts the over-allocation multicast subframe A to the unicast subframe format with a normal CP length; and as the number of the OFDM symbols occupied by the non-MBSFN region of the multicast subframe A is 1, the number of the OFDM symbols occupied by the control region of the converted unicast subframe A1 is 1; and step 2, the transmitting terminal bears the unicast service on the converted unicast subframe A1, and the specific bearing manner is the same as the manner of the unicast subframe bearing the unicast service in the related art.

In the Embodiment 4, the receiving terminal will perform the following processing:

if it is an R8 UE, the R8 UE receives the downlink resource assignment on the control region of the converted unicast subframe, and an error for the downlink resource assignment will be reported or the downlink resource assignment will be neglected; and if it is an R9 or later release UE, it performs the following operations:

step 1, receiving the downlink resource assignment on the control region of the converted unicast subframe;

step 2, the UE converting the receiving manner of the multicast subframe to the unicast subframe receiving manner; and step 3, the UE receives the unicast service on the converted unicast subframe, wherein the specific receiving manner is the same as the manner of the unicast subframe receiving the unicast service in the related art.

According to an embodiment of the present invention, a service bearing apparatus is further provided, which is used to realize the service bearing method, and can specifically be the network side or a functional module of the network side in the service bearing method.

Figure 11:
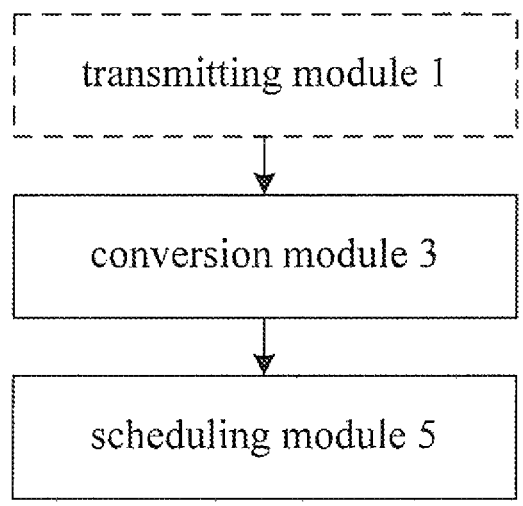
FIG. 11 is a structural schematic diagram of the service bearing apparatus according to an embodiment of the present invention.

FIG. 11 is a structural schematic diagram of the service bearing apparatus according to an embodiment of the present invention. As shown in FIG. 11, the service bearing apparatus according to an embodiment of the present invention mainly comprises: a conversion module 3 and a second scheduling module 5, wherein the conversion module 3 is adapted for converting on an MBSFN subframe the MBSFN subframe to a unicast subframe for bearing a unicast service, wherein the non-MBSFN region of the MBSFN subframe is converted to the control region of the unicast subframe; and the scheduling module 5 is connected to the conversion module 3 and adapted for, bearing the unicast service on the converted unicast subframe, and indicating downlink resource assignment information of the unicast service in a control region of the unicast subframe.

Further, as shown in FIG. 11, the apparatus can also, comprise: a transmitting module 1 adapted for transmitting, on the converted unicast subframe, a pilot and a scrambling code for bearing a unicast service.

According to an embodiment of the present invention, a receiving terminal is further provided. The receiving terminal can be used to receive the service data. Moreover, the receiving terminal can be used in coordination with the service bearing apparatus.

Figure 12:
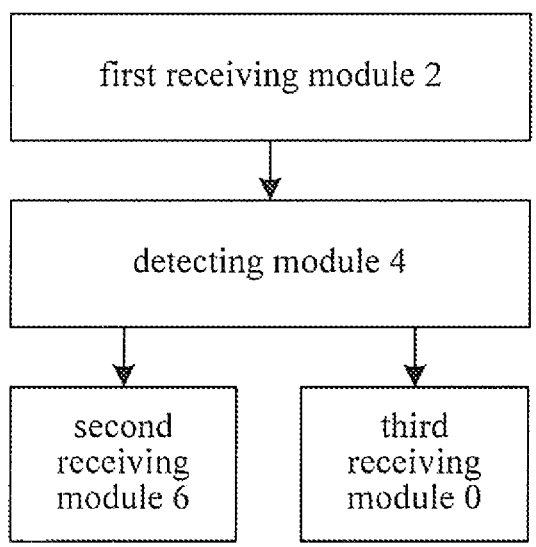
FIG. 12 is a structural schematic diagram of the receiving terminal according to an embodiment of the present invention.

FIG. 12 is a structural schematic diagram of the receiving terminal according to an embodiment of the present invention. As shown in FIG. 12, the receiving terminal according to an embodiment of the present invention mainly comprises: a first receiving module 2, a detecting module 4 and a second receiving module 6, wherein the first receiving module 2 is adapted for receiving an MBSFN subframe from the network side; the detecting module 4 is connected to the first receiving module 2 and adapted for detecting downlink resource assignment information in a non-MBSFN region of the received MBSFN subframe; and the second receiving module 6 is connected to the detecting module 4 and adapted for receiving, in the case where the downlink resource assignment information is detected by the detecting module 4 in the non-MBSFN region, user data in unicast subframe structure on the MBSFN subframe according to the detected downlink resource assignment information.

Further, as shown in FIG. 12, the receiving terminal can also comprise: a third receiving module 0 adapted for receiving, in the case where the downlink resource assignment information is not detected by the detecting module 4 in the non-MBSFN region, the contents of the non-MBSFN region of the MBSFN subframe.

As mentioned above, with the technical solutions provided in the embodiments of the present invention, when the network side schedules the MBMS service, if there exist overallocation multicast subframes, the over-allocation multicast subframes can be converted to unicast subframe structure for the transmission of the unicast service, such that the overallocation multicast subframes are used to bear the unicast service, which reuses the over-allocation multicast resources, avoids the waste of the over-allocation multicast resources, and improves the utilization rate of the radio resources.

The descriptions above are only preferable embodiments of the present invention, which are not used to restrict the present invention. For those skilled in the art, the present invention may have various changes and variations. Any amendments, equivalent substitutions, improvements etc. within the spirit and principle of the present invention are all concluded in the scope of the claims of the present invention.

What is claimed is:

1. A service bearing method, for bearing a service in multicast broadcast single frequency network (MBSFN) subframes, comprising:
    a network side converting the MBSFN subframe to a unicast subframe, wherein the length of cyclic prefix (CP) used by the converted unicast subframe is same as the length of CP of a non-MBSFN region of the MBSFN subframe, or the length of CP used by the converted unicast subframe is same as the length of CP of a subframe with number 0 of a frame in which the MBSFN subframe is located; and
    bearing a unicast service on the converted unicast subframe.

2. The method according to claim 1, wherein the step of converting the MBSFN subframe to the unicast subframe comprises:
    converting a non-MBSFN region of the MBSFN subframe to a control region of the unicast subframe.

3. The method according to claim 2, wherein the step of converting a non-MBSFN region of the MBSFN subframe to a control region of the unicast subframe comprises:
    taking the non-MBSFN region of the MBSFN subframe as the control region of the converted unicast subframe, wherein the number of the orthogonal frequency division multiplexing (OFDM) symbols occupied by the control region of the converted unicast subframe is the same as the number of the OFDM symbols occupied by the non-MBSFN region of the MBSFN subframe.

4. The method according to claim 3, wherein, after converting the MBSFN subframe to the unicast subframe, the method further comprises:
    indicating downlink resource assignment information of the unicast service in the control region of the unicast subframe.

5. The method according to claim 4, wherein the step of the network side bearing the unicast service on the converted unicast subframe comprises:
    transmitting by the network side on the converted unicast subframe a pilot which is used for bearing the unicast service.

6. The method according to claim 1, wherein, after converting the MBSFN subframe to the unicast subframe, the method further comprises:
    indicating downlink resource assignment information of the unicast service in the control region of the unicast subframe.

7. The method according to claim 6, wherein the step of the network side bearing the unicast service on the converted unicast subframe comprises:
    transmitting by the network side on the converted unicast subframe a pilot which is used for bearing the unicast service.

8. The method according to claim 6, wherein the step of the network side bearing the unicast service on the converted unicast subframe comprises:

transmitting by the network side on the converted unicast subframe a scrambling code sequence which is used for bearing the unicast service.

9. The method according to claim 6, wherein, after the network side bears a unicast service on the converted unicast subframe, the method further comprises:
a receiving terminal receiving the downlink resource assignment information on the control region of the converted unicast subframe; and
the receiving terminal receiving, according to the downlink resource assignment information, the unicast service on the converted unicast subframe.

10. The method according to claim 2, wherein, after converting the MBSFN subframe to the unicast subframe, the method further comprises:
indicating downlink resource assignment information of the unicast service in the control region of the unicast subframe.

11. The method according to claim 10, wherein the step of the network side bearing the unicast service on the converted unicast subframe comprises:
transmitting by the network side on the converted unicast subframe a pilot which is used for bearing the unicast service.

12. The method according to claim 10, wherein the step of the network side bearing the unicast service on the converted unicast subframe comprises:
transmitting by the network side on the converted unicast subframe a scrambling code sequence which is used for bearing the unicast service.

13. The method according to claim 10, wherein, after the network side bears a unicast service on the converted unicast subframe, the method further comprises:
a receiving terminal receiving the downlink resource assignment information on the control region of the converted unicast subframe; and
the receiving terminal receiving, according to the downlink resource assignment information, the unicast service on the converted unicast subframe.

14. A service data receiving method, which is used for receiving by a receiving terminal the service data transmitted by a network side, comprising:
the receiving terminal receiving a multicast broadcast single frequency network (MBSFN) subframe;
detecting downlink resource assignment information in a non-MBSFN region of the MBSFN subframe; and
receiving user data in unicast subframe structure on the MBSFN subframe according to the downlink resource assignment information.

15. The method according to claim 14, wherein, if the downlink resource assignment information is not detected in the non-MBSFN region of the MBSFN subframe, the method further comprises:
the receiving terminal only receiving the contents of the non-MBSFN region.

16. A service bearing apparatus, which is used for bearing a service in a multimedia broadcast and multicast service (MBMS) system, comprising:
a conversion module adapted for converting a multicast broadcast single frequency network (MBSFN) subframe to a unicast subframe, wherein the length of cyclic prefix (CP) used by the converted unicast subframe is same as the length of CP of a non-MBSFN region of the MBSFN subframe, or the length of CP used by the converted unicast subframe is same as the length of CP of a subframe with number 0 of a frame in which the MBSFN subframe is located; and
a scheduling module adapted for bearing a unicast service on the converted unicast subframe.

17. The apparatus according to claim 16, further comprising:
a transmitting module adapted for transmitting, on the converted unicast subframe, a pilot and/or a scrambling code sequence used for bearing the unicast service.

18. A receiving terminal, for receiving in a multimedia broadcast and multicast service (MBMS) system the service data transmitted by a network side, wherein the receiving terminal comprises:
a first receiving module adapted for receiving an a multicast broadcast single frequency network (MBSFN) subframe from the network side;
a detecting module adapted for detecting downlink resource assignment information in a non-MBSFN region of the received MBSFN subframe; and
a second receiving module adapted for receiving user data in unicast subframe structure on the MBSFN subframe according to the detected downlink resource assignment information.

19. The receiving terminal according to claim 18, wherein the receiving terminal further comprises:
a third receiving module adapted for receiving, in the case that the downlink resource assignment information is not detected by the detecting module in the non-MBSFN region, the contents of the non-MBSFN region.

* * * * *